(12) United States Patent  
Bayer et al.

(10) Patent No.: US 8,540,861 B2
(45) Date of Patent: Sep. 24, 2013

(54) METHOD FOR PRODUCING GEAR WHEELS

(75) Inventors: Erwin Bayer, Dachau (DE); Martin Bussmann, Schwabhausen (DE); Thomas Kraenzler, Salem (DE); Michael Lahres, Neu-Ulm (DE); Albin Platz, Ried-Baindlkirch (DE)

(73) Assignee: MTU Aero Engines GmbH, Munich (DE)

( * ) Notice: Subject to any disclaimer, the term of this patent is extended or adjusted under 35 U.S.C. 154(b) by 1178 days.

(21) Appl. No.: 11/720,741

(22) PCT Filed: Nov. 24, 2005

(86) PCT No.: PCT/DE2005/002114
§ 371 (c)(1),
(2), (4) Date: Sep. 21, 2009

(87) PCT Pub. No.: WO2006/060982
PCT Pub. Date: Jun. 15, 2006

(65) Prior Publication Data
US 2010/0012507 A1     Jan. 21, 2010

(30) Foreign Application Priority Data
Dec. 3, 2004  (DE) .......................... 10 2004 058 445

(51) Int. Cl.
*B23H 3/04*       (2006.01)
(52) U.S. Cl.
USPC ..................... 205/654; 204/224 M

(58) Field of Classification Search
USPC ..................... 205/654; 204/224 M
See application file for complete search history.

(56) References Cited

U.S. PATENT DOCUMENTS

| | | | |
|---|---|---|---|
| 4,705,615 A | 11/1987 | Hoffmann | |
| 4,772,368 A | 9/1988 | Rabian | |
| 6,835,299 B1 * | 12/2004 | Tchugunov | 205/654 |
| 7,462,273 B2 * | 12/2008 | Mielke | 205/651 |
| 7,867,374 B2 * | 1/2011 | Zdeblick et al. | 205/649 |
| 2004/0010914 A1 | 1/2004 | Saysette-Rasmussen et al. | |

FOREIGN PATENT DOCUMENTS

| | | |
|---|---|---|
| DE | 1 034 790 | 7/1958 |
| DE | 29 26 255 A1 | 1/1981 |
| EP | 579344 A1 * | 1/1994 |
| GB | 1 346 174 | 2/1974 |

OTHER PUBLICATIONS

PCT/DE2005/002114 PCT/ISA/210.

* cited by examiner

*Primary Examiner* — Nicholas A. Smith
(74) *Attorney, Agent, or Firm* — Crowell & Moring LLP

(57) ABSTRACT

A method for manufacturing gear wheels, specifically transmission gear wheels, is disclosed. An embodiment of the method includes the following steps: a) preparation of a base body for a gear wheel, b) electrochemical processing of the base body by a precise electrochemical machining process (PECM process), where several recesses running between the teeth of the gear wheel are made simultaneously electrochemically to manufacture the teeth of the gear wheel.

13 Claims, 1 Drawing Sheet

//  METHOD FOR PRODUCING GEAR WHEELS

This application claims the priority of International Application No. PCT/DE2005/002114, filed Nov. 24, 2005, and German Patent Document No. 10 2004 058 445.1, filed Dec. 3, 2004, the disclosures of which are expressly incorporated by reference herein.

BACKGROUND AND SUMMARY OF THE INVENTION

The invention relates to a method for producing gear wheels, specifically transmission gear wheels.

In vehicle transmissions and in transmissions for aircraft engines higher power densities with smaller dimensions and lower overall weights are increasingly being required for the transmissions. As a result, the load on the gear wheels used in the transmissions is increasing. In order to be able to subject the gear wheels to greater loads, new design principles for the gear wheels are required. Such high-performance gear wheels which can be subjected to high loads have, for example, new involute shapes or stiffening ribs running in the circumferential direction. Such high-performance gear wheels cannot, however, be manufactured with the necessary accuracy using the production methods known from the prior art such as milling, broaching, grinding, honing and lapping. Specifically, the manufacture of gear wheels which have reinforcing ribs running in the circumferential direction using the manufacturing methods known from the prior art presents serious difficulties.

With this as the point of departure, the problem for the present invention is to create a novel method for manufacturing gear wheels, specifically transmission gear wheels.

In accordance with the invention, the method comprises at least the following steps a) preparation of a base body for a gear wheel, b) electrochemical processing of the base body through a precise electrochemical machining process (PECM process), in which several recesses running between the teeth are made simultaneously by electrochemical means to produce the teeth of the gear wheel.

With the present invention it is provided for the first time to produce gear wheels with the help of a precise electrochemical machining process. This makes it possible to manufacture high-performance gear wheels with stiffening ribs and/or new involute forms with the necessary accuracy. This makes it possible to increase the forces which can be absorbed by the teeth of a gear wheel and to use this potential to reduce the dimensions of the gear wheel.

Preferably a base body is prepared for the gear wheel which is already preformed or preshaped.

In accordance with an advantageous refinement of the invention, several working electrodes are moved simultaneously through a relative radial motion between the base body and the particular working electrode into the base body.

In accordance with an alternative advantageous refinement of the invention, a working electrode which has a cross-sectional contour of the gear wheel to be manufactured is moved into the base body as the result of a relative axial motion between the base body and the working electrode.

Preferred refinements of the invention can be derived from the description hereinafter.

BRIEF DESCRIPTION OF THE DRAWINGS

One embodiment of the invention, without being restricted thereto, is explained in more detail with respect to the drawings.

DETAILED DESCRIPTION OF THE DRAWINGS

Hereinafter the present invention is described in greater detail with reference to FIGS. 1 to 4.

Figure 1:
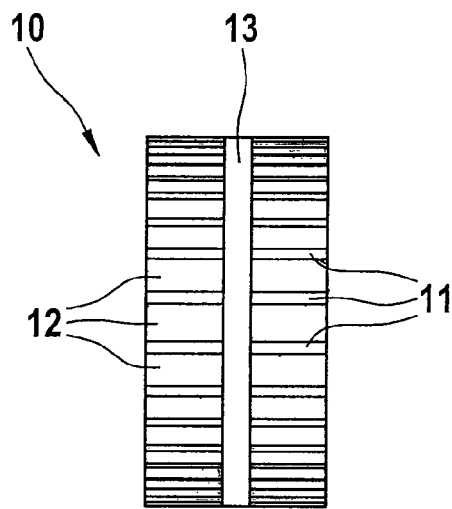
FIG. 1 shows a schematic diagram of a first gear wheel manufactured in accordance with the method from the invention.
Figure 2:
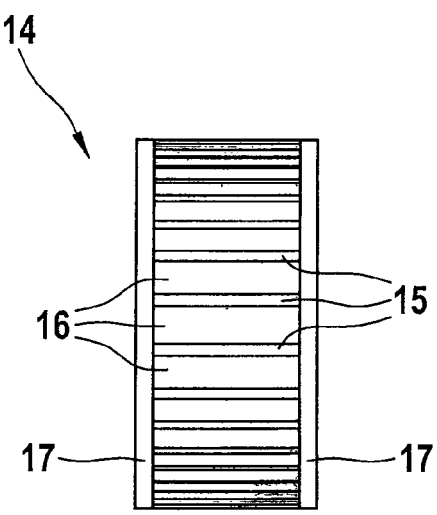
FIG. 2 shows a schematic diagram of a second gear wheel manufactured in accordance with the method from invention.
Figure 3:
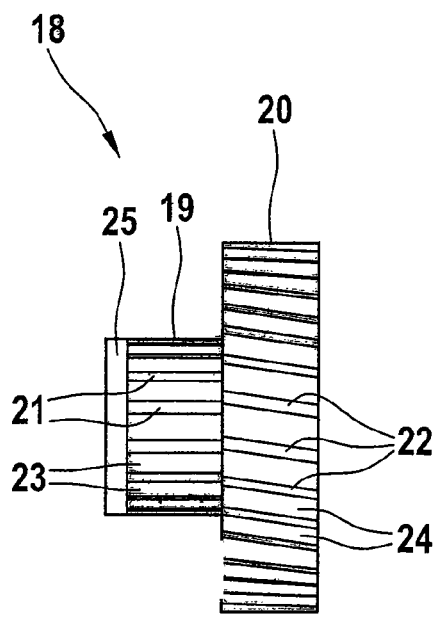
FIG. 3 shows a schematic diagram of a third gear wheel manufactured in accordance with the method from the invention.

FIGS. 1 to 3 all show high-performance gear wheels for transmissions which can be manufactured with the assistance of the method in accordance with the invention. FIG. 1 shows a gear wheel 10 having several teeth 11 spaced circumferentially apart, where a recess 12 is positioned between two adjacent teeth 11. In order to increase the forces which can be absorbed by the teeth 11, the gear wheel 10 has a circumferentially closed stiffening rib 13 which in the embodiment from FIG. 1 is positioned approximately in the axial center of the gear wheel 10.

FIG. 2 shows an additional gear wheel 14 with several teeth 15 spaced apart in the circumferential direction, where a recess 16 is located between adjacent teeth 15. The gear wheel 14 from FIG. 2 has a stiffening rib 17 on both axial ends running in the circumferential direction. In the embodiment from FIG. 2 the recesses 16 are consequently open only between two adjacent teeth 15 in the radial direction.

FIG. 3 shows a gear wheel 18 made up of two partial gear wheels 19 and 20 spatially immediately adjacent. Each of the partial gear wheels 19 and 20 have teeth 21 or 22 spaced apart in turn in the circumferential direction, where a recess 23 or 24 is located between two adjacent teeth in turn. The two partial gear wheels 19 and 20 have different diameters, where the two partial gear wheels 19 and 20 are immediately proximate. In the embodiment from FIG. 3 the partial gear wheel 19 with the smaller diameter at one axial end has a closed stiffening rib 25 in the circumferential direction where the partial gear wheel 19 borders the stiffening rib 25. As a result, the recesses 23 in the partial gear wheel 19 are in turn only open in the radial direction.

The gear wheels 10, 14 and 18 in accordance with FIGS. 1 to 3 can all be manufactured using the procedure in accordance with the invention. To this end, a basic body is prepared for the gear wheel 10, 14, or 18 to be manufactured and positioned in an electrolyte. The prepared base body is preferably preshaped or preformed, so it has already preshaped teeth or stiffening ribs. For precision machining the base body is machined using precise electrochemical machining (PECM) process, in which recesses to form the teeth of the gear wheel between the teeth running are made simultaneously by electrochemical means. To do this, several working electrodes are moved into the base body in the radial direction around the circumference for the gear wheel to be produced. All the recesses are preferably formed simultaneously around the circumference of the gear wheel to be produced between the teeth of the gear wheel.

The preshaped or preformed base body for the gear wheel to be produced is preferably a base body produced by precision casting or forging or powdered metal injection molding.

Figure 4:
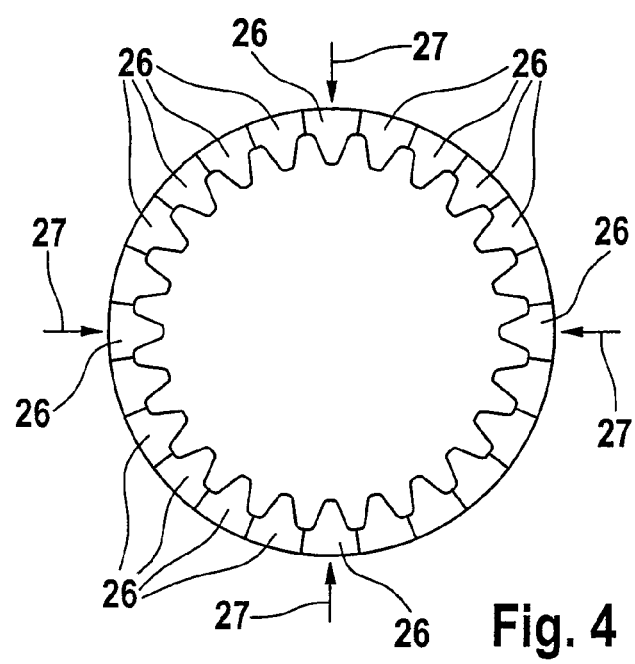
FIG. 4. shows a schematic diagram of an electrode array for use in the method in accordance with the invention.

FIG. 4 shows schematically an array of several workingelectrodes where each of the working electrodes 26 serves to electrochemically make a recess positioned between two adjacent teeth. Each of the working electrodes is moved separately into the body of the gear wheel in a radial direction when the recesses are made. This motion in the radial direction is represented for four of the working electrodes in FIG. 4 by arrows 27. The teeth, or recesses, positioned next to each other in the circumferential direction are all produced simultaneously.

As an alternative, it is possible to move a working electrode which has a cross-sectional contour of the gear wheel to be manufactured through an axial relative motion between the base body and the working electrode into the base body. By this means, all recesses between the teeth of the gear wheel can be produced simultaneously around the extent of the gear wheel to be manufactured.

Using the method in accordance with the invention, high-performance gear wheels for transmissions can be manufactured with stiffening ribs, or supporting ribs, running in the circumferential direction and new involute shapes. As a result, the teeth of the gear wheels can absorb higher loads, and this potential can be used to reduce the dimensions of the gear wheel. By using preformed or preshaped base bodies which can be manufactured by precision casting, the entire gear wheel can be produced in one process in a short time by using subsequent precision machining with the help of a precise electrochemical machining process. The making of the recesses between adjacent teeth on the gear wheel preferably takes place synchronously by advancing a working electrode in the radial direction into the base body for each recess. Furthermore the manufacture of coupled gear wheels with different dimensions and different tooth patterns is possible without the need to join the partial wheels. So it is possible to produce gear wheels with partial gear teeth of different diameters in one manufacturing step.

It should be pointed out that precise electrochemical machining (PECM) is an electrochemical removal process with which considerably better or greater precision can be achieved than with a traditional ECM process. PECM is an electrochemical removal process with vibrating working electrodes where a preferably pulsing direct current is applied between the individual working electrode and a surface of the part to be machined. As a result, material removal can be effected on the surface. With PECM, small gaps are maintained between the working electrodes and the surface of the part to be processed, where the gaps can be reduced to about 10 μm compared with the traditional ECM process. Since the necessary rinsing of the gap with fresh electrolyte cannot be implemented with such small gaps, removal and rinsing are performed sequentially. Removal takes place with the smallest possible gap, rinsing with the largest possible gap. This results ultimately in a vibrating or oscillating electrode motion. Gaps between the or each working electrode and the base body are thus provided with electrolyte.

What is claimed is:

1. A method for producing gear wheels, comprising the steps of:
   a) preparation of a base body for a gear wheel; and
   b) electrochemical processing of the base body by a precise electrochemical machining process, wherein to manufacture teeth of the gear wheel several recesses running between the teeth are made electrochemically at a same time by several working electrodes moving simultaneously into the base body by way of a relative radial motion between the base body and the working electrodes.

2. The method according to claim 1, wherein the prepared base body is preformed or preshaped.

3. The method according to claim 2, wherein the preformed or preshaped base body is manufactured by precision casting or by forging or by powder-metallic injection molding.

4. The method according to claim 1, wherein a number of working electrodes equals a number of recesses running between the teeth.

5. The method according to claim 1, wherein all recesses positioned next to each other in a circumferential direction of the gear wheel are made by electrochemical means at the same time.

6. The method according to claim 1, wherein a gap between the working electrodes and the base body are supplied with electrolyte.

7. The method according to claim 1, wherein the gear wheel is a transmission gear wheel.

8. A method for producing a transmission gear wheel, comprising the steps of:
   preforming a base body; and
   machining the preformed base body by a precise electrochemical machining (PECM) process to form teeth of the gear wheel, wherein the PECM process utilizes a plurality of electrodes and wherein the electrodes move relative to the preformed base body in a radial direction to form a respective recess between adjacent teeth of the gear wheel.

9. The method according to claim 8, wherein the step of preforming the base body includes the step of preforming the teeth of the gear wheel.

10. The method according to claim 8, wherein the step of preforming the base body includes the step of forming a stiffening rib.

11. The method according to claim 8, wherein the teeth are formed simultaneously by the PECM process.

12. The method according to claim 8, wherein the PECM process includes the steps of sequentially removing a material from the preformed base body across a gap between an electrode and the preformed base body, increasing a size of the gap, and rinsing the increased sized gap.

13. The method according to claim 12, wherein the gap is approximately 10 μm.

* * * * *